Jan. 29, 1929.
1,700,670
J. DE FRANCISCI
MACARONI PRESS
Original Filed Dec. 1, 1921
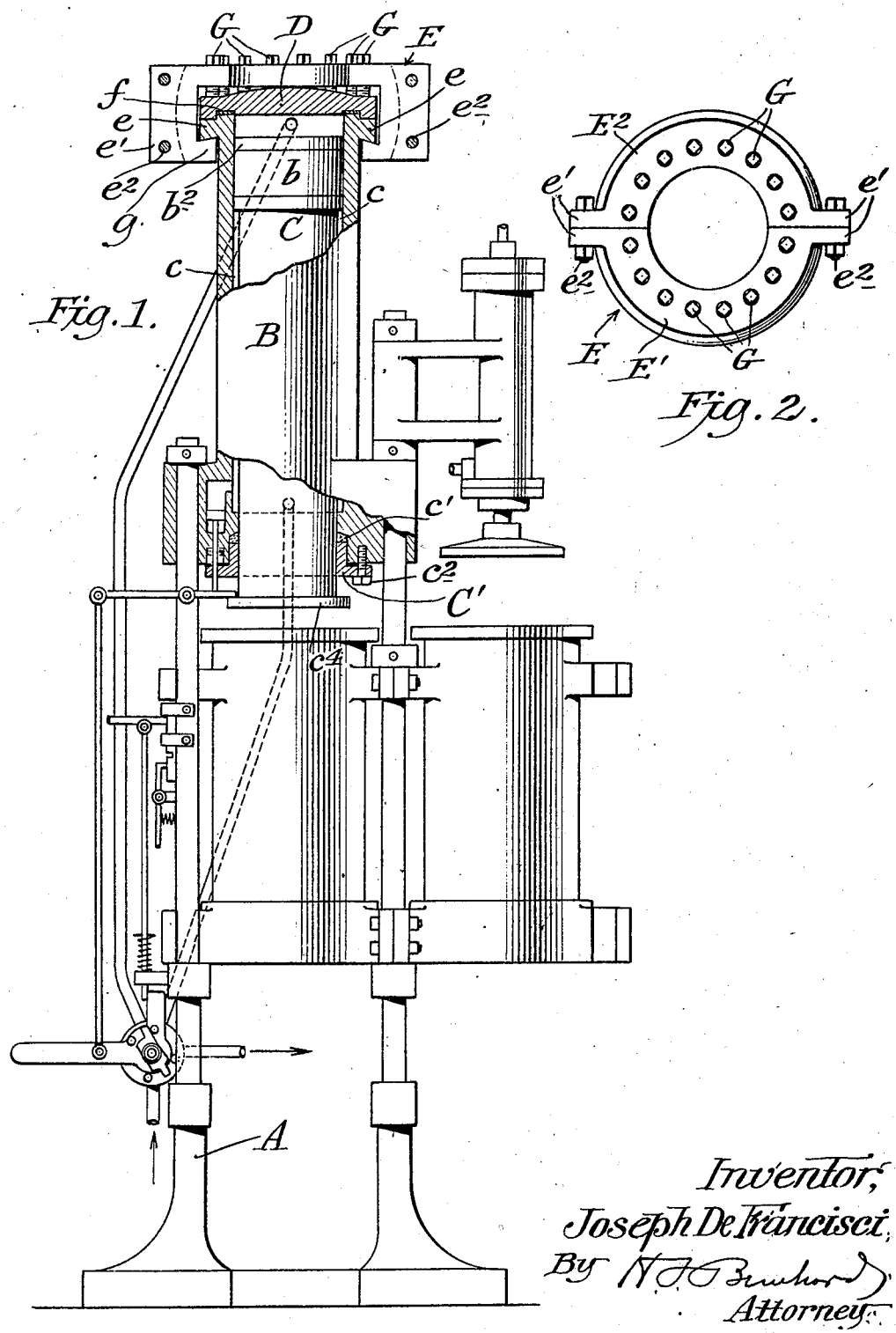

Patented Jan. 29, 1929.

1,700,670

UNITED STATES PATENT OFFICE.

JOSEPH DE FRANCISCI, OF BROOKLYN, NEW YORK, ASSIGNOR TO CONSOLIDATED MACARONI MACHINE CORPORATION, OF NEW YORK, N. Y., A CORPORATION OF NEW YORK.

MACARONI PRESS.

Original application filed December 1, 1921, Serial No. 519,108. Divided and this application filed June 21, 1924. Serial No. 721,455.

This invention is a press for the production of macaroni, and the subject-matter of this application is a division of a prior application filed by me on December 1, 1921, Serial No. 519,108.

The object of the invention is to secure a tight connection between the plunger cylinder and a detachable head for said cylinder, whereby leakage of the fluid supplied under hydraulic pressure is precluded from the cylinder.

According to this invention, the plunger cylinder is provided with an external solid collar adjacent the outer (upper) end thereof, and on this end of said cylinder is fitted a detachable cylinder head, a compressible packing being interposed between cylinder and head. Co-operating with the head is a clamp in the form of a ring composed of separable parts bolted solidly together, said annular clamp being provided with a flange or lugs adapted to fit snugly to the under side of the cylinder collar so as to interlock therewith. The annular clamp carries a number of binding screws adapted for contact with the cylinder head. These screws are tightened against the head for compressing the gasket, and the pressure of the screws is resisted by the flange or lugs of the clamp in engagement with the cylinder collar, whereby I am enabled to obviate the elongation of the ordinary stud bolts under the hydraulic pressure and to retain the head in such tight relation to the cylinder as to effectually preclude leakage of the motive fluid.

Other functions and advantages of the invention will appear from the following description taken in connection with the accompanying drawings, wherein—

Figure 1 is a vertical sectional elevation of a part of the hydraulic cylinder provided with a non-leaking cylinder head of this invention.

Figure 2 is a plan view of the plunger cylinder.

Mounted in the press frame A of suitable construction, is a plunger cylinder B within which operates a plunger C, the diameter of which is slightly less than the internal diameter of the plunger cylinder so as to leave an intermediate space $c$. At its upper end the plunger is provided with a piston head $b$ and with packings $b'$ $b^2$ of any suitable character. At its lower end the plunger is provided with a flange $c^4$, with which co-operates means for shifting the valve mechanism shown and described in the above named application, but forming no part of this application. The upper end of the cylinder is closed by a head D adapted to be clamped by novel means constituting a part of my invention. The cylinder is provided at its upper end with an external flange $e$ extending outwardly from the cylinder wall, and between the cylinder wall and the head is positioned a compressible gasket $f$ adapted to produce a liquid tight connection between the cylinder wall and the head so as to effectually preclude the leakage of the motive fluid supplied under the required pressure to the end of the cylinder in forcing the plunger downwardly with an effective stroke. One of the improvements which I have made consists of means for clamping the head D under the cylinder in a way to resist the hydraulic pressure supplied to the cylinder between the piston head of the plunger and the removable cylinder head D.

E designates a clamp composed of complemental sections E' E² provided with radial flanges $e'$ and assembled in abutting relation so as to be secured solidly together by transverse bolts $e^2$, as shown more clearly in Figure 2. The annular clamp is of separable construction for ready assemblage with respect to the upper end of the cylinder, as essential feature of the annular clamp consisting of the inwardly extending flange $g$ provided on the lower edge of the clamp and adapted for engagement with the under face of the external shoulder $e$ provided on the cylinder. The annular clamp carries a series of set screws or stud bolts G which are screwed into threaded bores provided in the clamp, said set screws or stud bolts being adapted to be tightened against the head D for the purpose of drawing the flange $g$ of the clamp into tight engagement with the external shoulder of the cylinder. It will be noted that the stud bolts G press downwardly upon the cylinder head and draw upwardly on the annular clamp, whereby the flange $g$ of the clamp has a firm bearing against the cylinder shoulder, and the head D is forced downwardly toward the cylinder for compressing the gasket $f$ in order to secure the necessary liquid tight connection between the cylinder and its head. In my invention the stud bolts G are not subjected to elongated strain under hydraulic pressure admitted to the cylinder, and thus the stud bolts serve as an efficient means for holding the cylinder head in tight engagement with the cylinder for precluding leakage of the hydraulic pressure. The lower end of the plunger cylinder is open so that the plunger or ram C may travel therein; but the motive fluid is precluded from leaking from the open lower end of said plunger cylinder by a packing $c'$ positioned within a recess provided in the cylinder wall, as shown in Figure 1. This packing is compressed around the plunger by a gland $C'$ secured to the end face of the cylinder by stud bolts $c^2$, said packing $c'$ being of a form commonly used in the art so as to be expanded by the pressure of the motive fluid in order to secure the necessary contact with the plunger or ram.

From the foregoing description it will be noted that I have provided simple means for taking the pressure off the bolts and imposing or transmitting such pressure to the collar $e$ provided as a unitary part of the cylinder. So far as I am aware, hydraulic presses are constructed with a series of head-tightening bolts which are so supported that the pressure internally of the cylinder is taken up by the bolts, but experience shows that the constant application of the high pressures prevalent in hydraulic presses tends to stretch and elongate such bolts with the result that the pressure fluid ultimately leaks through the joint intervening the cylinder head and the cylinder. The heads of hydraulic cylinders are unbroken and present continuous surfaces to the pressure of the motive fluid, and as such interior surface of a cylinder head is of relatively large area and is continuous and unbroken, there is presented a substantial area of surface for the application of the high pressure fluid present within the cylinder. In my invention, the form of the cylinder and the form of the cylinder head are fashioned to adapt the same mutually for co-operation with a gasket. As compared with ordinary pressure cylinders of the standard hydraulic presses, I have modified the form of the cylinder by making integral therewith an external collar, presenting a solid continuous surface. The form of the cylinder head which I have provided involves the use of a solid unbroken rim, the under face of which near to the edge is recessed, and said rim on said under face is depending below the plane of the recess, whereby a packing is receivable within the recess, whereas the pendent rim portion of the head is adapted to be seated on the top face of the cylinder collar, as a result of which there is provided on the cylinder head a part or member located exteriorly to the gasket and in pendent relation thereto for minimizing leakage of the high pressure fluid. The support for the binding screws is in the form of an annular clamp fashioned for locking engagement with the collar and affording a substantial area for mounting the binding screws. Owing to the high pressure to be withstood by the cylinder head, I have found that my invention demands a form of head, cylinder collar and screw-supporting clamp of the most substantial form, and to these ends I have constructed said clamp in two parts, the line of division between said parts being radial to the axis of the cylinder head. The clamp is divided on radial lines so as to afford flat surfaces in abutting contact, and the components of the clamp are joined solidly and in abutting contact on the radial lines by bolts which pass through ears as shown in Figure 2. The clamp is thus separable to facilitate its application to the cylinder and its removal therefrom, the whole presenting a substantial construction for resisting the pressure of the fluid within the cylinder. The separable clamp is furnished with an inwardly extending continuous flange $g$ for firm engagement with the unbroken collar of the cylinder, and said clamp presents a substantial overhang to the cylinder head, in which overhang is mounted the binding screws to have direct contact with the cylinder head. The binding screws are in contact with the cylinder head on a circular line outside of the packing, as shown in Figure 1, and thus said screws act to press on the cylinder head to force its pendent rim into contact with the shoulder, the effect of which is to compress the packing by a form of construction which takes up the strain occasioned by the pressure of the fluid against the unbroken continuous under surface of the cylinder head.

Having thus fully described the invention, what I claim as new and desire to secure by Letters Patent is:

1. In a hydraulic press, a pressure cylinder provided with an external solid collar the surfaces of which are unbroken, a pressure head the undersurface of which is continuous and unbroken for exposure to hydraulic pressure within said cylinder, said head being provided adjacent its margin with a recess and said marginal part of the head being formed with a continuous solid rim the underface of which is in a plane below said recess, whereby the rim portion of the head is positioned for contact with said collar, said contacting faces of the rim and of the collar being in a plane below the recess, a packing in said recess and contacting with the edge of the cylinder wall, a clamp divided on a line radial to the cylinder head and producing separable members which are united solidly together with the radial faces along the dividing line in contacting relation, said separable clamp having a bottom shoulder in direct engagement with the unbroken collar of the cylinder, and tightening screws supported by the clamp and engaging with the rim portion of said head on a line exteriorly to the packing.

2. In a hydraulic press, a pressure cylinder provided with an external solid collar the surfaces of which are unbroken, a cylinder head the undersurface of which is continuous and unbroken for exposure to hydraulic pressure within the cylinder, said pressure head being provided with a solid rim positioned for contact with the collar, a packing interposed between the cylinder wall and said cylinder head, a clamp having a shoulder positioned for engagement with the collar, said clamp being divided on lines radial to the cylinder axis and producing a plurality of complemental parts having abutting contact on the radial line of division and said complemental parts being united into a unitary structure the parts of which are separable for application to and removal from said collar, and a series of binding screws tapped into said clamp and engaging frictionally with said pressure head, whereby the hydraulic thrust on said cylinder head is transmitted through said screws and the clamp to the solid shoulder of the cylinder.

3. A hydraulic press closure embodying a pressure cylinder provided with an integral collar extending outwardly from the cylinder wall and positioned below the plane of the end face of said cylinder wall, an imperforate head provided at the edge thereof with a depending flange positioned in matching relation to said collar of the cylinder wall, the under face of said imperforate head being provided with a gasket groove in a plane within said depending flange and in register with said end face of the cylinder wall, a gasket within said groove and contacting with the end face of the cylinder wall and with the cover, a divided separable clamp having two circular shoulders one of which fits beneath said integral cylinder collar and the other of which extends over the cover and is spaced with respect thereto, and a series of clamping screws mounted in said separable clamp and contacting with the marginal portion of said cover, said clamping screws operating to apply pressure to the cover in the plane of the integral cylinder collar and to exert through said cover a compressive force upon the packing, said divided clamp operating to transmit to the cylinder collar the hydraulic pressure applied to the inner surface of said imperforate head and to relieve the clamping screws from elongation occasioned by such pressure.

4. A hydraulic press cylinder closure embodying a hydraulic cylinder provided with an unbroken circular collar extending continuously around the cylinder exteriorly thereof, a pressure head seated against the end face of said cylinder, said pressure head having an unbroken under surface exposed to the pressure of hydraulic fluid within said cylinder, a radially-divided separable clamp provided with two shoulders, the lower one of which contacts with said collar and the other of which extends over said pressure head in spaced relation thereto, a series of clamping screws supported in the members composing said separable clamp, and means for rigidly and detachably connecting the members of said separable clamp, whereby the hydraulic pressure within the cylinder and against the head imparts a thrust to said separable clamp in a direction for the lower shoulder thereof to coact with said cylinder collar in resisting the effect of said hydraulic pressure upon the clamping screws and said separable clamp with the clamping screws is demountable with facility from the hydraulic cylinder.

In testimony whereof I have hereto signed my name this 20th day of June, 1924.

JOSEPH DE FRANCISCI.